United States Patent
Liu et al.

(10) Patent No.: US 9,599,802 B2
(45) Date of Patent: Mar. 21, 2017

(54) LENS AND BACKLIGHT MODULE

(71) Applicants: Hung-Wei Liu, Hsin-Chu (TW); Chin-Ku Liu, Hsin-Chu (TW)

(72) Inventors: Hung-Wei Liu, Hsin-Chu (TW); Chin-Ku Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 64 days.

(21) Appl. No.: 14/703,903

(22) Filed: May 5, 2015

(65) Prior Publication Data
US 2016/0025297 A1 Jan. 28, 2016

(30) Foreign Application Priority Data

Jul. 24, 2014 (CN) .......................... 2014 1 0354195

(51) Int. Cl.
| F21V 5/04 | (2006.01) |
| G02B 19/00 | (2006.01) |
| G02B 3/08 | (2006.01) |
| G02F 1/1335 | (2006.01) |

(52) U.S. Cl.
CPC .......... *G02B 19/0061* (2013.01); *G02B 3/08* (2013.01); *G02B 19/0028* (2013.01); *G02F 2001/133607* (2013.01)

(58) Field of Classification Search
CPC . G02B 19/0071; G02B 19/0061; F21V 5/046; F21V 5/04; F21V 5/004
See application file for complete search history.

(56) References Cited

U.S. PATENT DOCUMENTS

| 6,674,096 B2 | 1/2004 | Sommers |
| 7,347,590 B2 | 3/2008 | Lee et al. |
| 7,549,781 B2 | 6/2009 | Kim et al. |
| 7,746,565 B2* | 6/2010 | Paek .................... G02B 6/0018 257/81 |
| 7,866,844 B2 | 1/2011 | Yamaguchi |
| 8,128,260 B2 | 3/2012 | Ariyoshi |
| 8,585,239 B1* | 11/2013 | Tseng ........................ F21V 5/04 362/244 |
| 9,175,832 B2* | 11/2015 | Sy ........................... F21V 13/04 |

(Continued)

FOREIGN PATENT DOCUMENTS

| KR | 101299528 | 8/2013 |
| TW | M405521 | 6/2011 |

*Primary Examiner* — Julie Bannan
(74) *Attorney, Agent, or Firm* — Jianq Chyun IP Office

(57) ABSTRACT

A lens includes a central portion and a surrounding portion. The central portion has a first and a second optical surfaces. The surrounding portion surrounds the central portion and has an inner refraction wall and an outer refraction wall. The outer refraction wall includes a first and a second outer surfaces. A distance between the symmetry axis and a junction of the inner refraction wall and the first optical surface is a first radius R1. A distance between the symmetry axis and a junction of the first outer surface and the second optical surface is a second radius R2. A distance between the symmetry axis and a junction of the second outer surface and the first outer surface is a third radius R3. The third radius R3 is greater than the second radius R2, and the second radius R2 is greater than or equal to the first radius R1.

38 Claims, 7 Drawing Sheets

(56) References Cited

U.S. PATENT DOCUMENTS

| | | | | |
|---|---|---|---|---|
| 2006/0245083 A1* | 11/2006 | Chou | ............... | G02B 19/0061 |
| | | | | 359/726 |
| 2009/0296405 A1* | 12/2009 | Tetsuo | ................ | F21K 9/00 |
| | | | | 362/308 |
| 2010/0208456 A1* | 8/2010 | Huang | ................ | F21V 5/04 |
| | | | | 362/231 |
| 2011/0305026 A1* | 12/2011 | Mochizuki | ............... | F21V 5/04 |
| | | | | 362/308 |
| 2012/0044698 A1* | 2/2012 | Hsueh | ................ | F21V 3/00 |
| | | | | 362/304 |
| 2012/0044700 A1* | 2/2012 | Chen | ................ | F21V 3/00 |
| | | | | 362/311.02 |
| 2013/0100679 A1* | 4/2013 | Lin | ................ | F21V 5/04 |
| | | | | 362/327 |
| 2014/0327905 A1* | 11/2014 | Kuo | ................ | G01M 11/0221 |
| | | | | 356/127 |

\* cited by examiner

LENS AND BACKLIGHT MODULE

CROSS-REFERENCE TO RELATED APPLICATION

This application claims the priority benefit of Chinese application serial no. 201410354195.X, filed on Jul. 24, 2014. The entirety of the above-mentioned patent application is hereby incorporated by reference herein and made a part of this specification.

BACKGROUND

Technical Field

The invention relates to a lens and a backlight module, and particularly relates to a lens capable of providing uniform light brightness and a backlight module.

Related Art

Generally, if light emitting diodes (LEDs) are disposed under a diffusion plate of a backlight module by a predetermined distance, an observer is liable to observe non-uniform brightness distribution on the diffusion plate. The predetermined distance is an optical distance (OD). Presently, the problem of non-uniform light brightness distribution may be resolved by increasing the optical distance or increasing a number of the LEDs to shorten a pitch between the LEDs. However, increase of the optical distance may increase a whole thickness of the backlight module, which is of no avail for a current trend of product thinness, and increase of the number of the LEDs may increase product cost, which is uneconomic. Moreover, a secondary optical lens may be configured to the LED to resolve the problem of non-uniform brightness distribution of the backlight module while the number of the LEDs is decreased or the optical distance is decreased. However, there is still a certain limitation of the optical distance in usage of the existing secondary optical lens, and the existing secondary optical lens may only be used in the optical distance of 25 mm. When the optical distance is decreased, referring to a schematic diagram of brightness distribution of a backlight module of FIG. 1, the existing secondary optical lens guides the light beam to an area A away from the LED C (having the secondary optical lens), such that the light beam around an area B close to the LED C (having the secondary optical lens) is inadequate to form a dark ring, by which another problem of non-uniform brightness is encountered.

Under the trend of product thinness, the current secondary optical lens may have the aforementioned problem of non-uniform brightness when the optical distance is decreased, so that the optical distance may not be effectively decreased. Therefore, how to reduce the optical distance while considering the brightness uniformity and product taste is an important issue to be developed.

U.S. Pat. No. 7,549,781B2 discloses an LED module including an LED chip, a chip substrate and a lens. U.S. Pat. No. 8,128,260B2 discloses a lens having a plurality of surfaces and refracting portions. U.S. Pat. No. 7,347,590B2 discloses a lens having a plurality of lens portions. U.S. Pat. No. 6,674,096B2 discloses a hemispherical transparent encapsulant of an LED package having a recess relative to an LED chip.

The information disclosed in this Background section is only for enhancement of understanding of the background of the described technology and therefore it may contain information that does not foam the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a lens and a backlight module, which are capable of providing a uniform light brightness distribution in a thin optical distance.

Other objects and advantages of the invention can be further illustrated by the technical features broadly embodied and described as follows.

In order to achieve one or a portion of or all of the objects or other objects, an embodiment of the invention provides a lens including a central portion and a surrounding portion. The central portion has a first optical surface and a second optical surface opposite to the first optical surface. The surrounding portion surrounds the central portion while taking a symmetry axis of the central portion as a center. The surrounding portion has an inner refraction wall and an outer refraction wall opposite to the inner refraction wall. The inner refraction wall is connected to the first optical surface to form a recess. The recess is used for accommodating a light emitting diode. The outer refraction wall includes a first outer surface and a second outer surface. The first outer surface is connected to the second optical surface, and the second outer surface is connected to the first outer surface. Taking the symmetry axis as a center, a distance between the symmetry axis and a junction of the inner refraction wall and the first optical surface is a first radius R1. A distance between the symmetry axis and a junction of the first outer surface and the second optical surface is a second radius R2. A distance between the symmetry axis and a junction of the second outer surface and the first outer surface is a third radius R3. The third radius R3 is greater than the second radius R2, and the second radius R2 is greater than or equal to the first radius R1.

In order to achieve one or a portion of or all of the objects or other objects, an embodiment of the invention provides a backlight module, which is adapted to provide a backlight source to a display module. The backlight module includes a diffusion plate and a plurality of light emitting units. The light emitting units are arranged in an array and are disposed on a substrate. The light emitting units are arranged in a pitch along a direction, and the substrate and the diffusion plate are spaced by an optical distance. Each of the light emitting units includes a light emitting diode and a lens. The lens includes a central portion and a surrounding portion. The central portion has a first optical surface and a second optical surface opposite to the first optical surface. The surrounding portion surrounds the central portion while taking a symmetry axis of the central portion as a center. The surrounding portion has an inner refraction wall and an outer refraction wall opposite to the inner refraction wall. The inner refraction wall is connected to the first optical surface to form a recess. The recess is used for accommodating the light emitting diode. The outer refraction wall includes a first outer surface and a second outer surface. The first outer surface is connected to the second optical surface, and the second outer surface is connected to the first outer surface. Taking the symmetry axis as a center, a distance between the symmetry axis and a junction of the inner refraction wall and the first optical surface is a first radius R1. A distance between the symmetry axis and a junction of the first outer surface and the second optical surface is a second radius R2. A distance between the symmetry axis and a junction of the second outer surface and the first outer surface is a third radius R3. The third radius R3 is greater than the second radius R2, and the second radius R2 is greater than or equal to the first radius R1. A ratio between the optical distance and the pitch is smaller than or equal to 0.13.

In one embodiment of the invention, the surrounding portion has a bottom surface, and the bottom surface connects the second outer surface and the inner refraction wall.

In one embodiment of the invention, a distance between the symmetry axis and a junction of the bottom surface and the second outer surface is a fourth radius R4, wherein the fourth radius R4 is greater than the third radius R3.

In one embodiment of the invention, the first radius R1, the second radius R2, the third radius R3 and the fourth radius R4 are complied with following conditions: 0.75<R3/R4<0.9, 0.6<R2/R4<0.75, 0.4<R1/R4<0.6.

In one embodiment of the invention, a distance between the symmetry axis and a junction of the bottom surface and the inner refraction wall is a fifth radius R5, wherein the fifth radius R5 is greater than or equal to the first radius R1, and the second radius R2 is greater than or equal to the fifth radius R5.

In one embodiment of the invention, a distance between the bottom surface and the junction of the inner refraction wall and the first optical surface is a first vertical height H1, a distance between the bottom surface and the junction of the first outer surface and the second optical surface is a second vertical height H2, and a distance between the bottom surface and the junction of the second outer surface and the first outer surface is a third vertical height H3, wherein the second vertical height H2 is greater than the third vertical height H3, and the third vertical height H3 is greater than or equal to the first vertical height H1.

In one embodiment of the invention, the first vertical height H1, the second vertical height H2 and the third vertical height H3 are complied with following conditions: 0.4<H3/H2<0.7, 0.2<H1/H2<0.4.

In one embodiment of the invention, an included angle between the inner refraction wall and a normal vector of the bottom surface is θ1, wherein the included angle θ1 is smaller than or equal to 10 degrees and is greater than or equal to 0 degree.

In one embodiment of the invention, an included angle between the first outer surface and the normal vector of the bottom surface is θ2, and an included angle between the second outer surface and the normal vector of the bottom surface is θ3, wherein the included angle θ2 is not equal to the included angle θ3.

In one embodiment of the invention, an included angle between the inner refraction wall and the normal vector of the bottom surface is θ1, wherein the included angle θ2 and the included angle θ3 are greater than the included angle θ1.

In one embodiment of the invention, the included angle θ2 is smaller than or equal to 45 degrees and is greater than 0 degree.

In one embodiment of the invention, the included angle θ3 is smaller than or equal to 45 degrees and is greater than 0 degree.

In one embodiment of the invention, in a cross-sectional view of the lens, the first outer surface is a straight line or a curve, and the second outer surface is a straight line or a curve.

In one embodiment of the invention, the bottom surface comprises a plurality of optical microstructures.

In one embodiment of the invention, each of the optical microstructures is a cone protruding outward relative to the bottom surface, a profile of each of the cones in a cross-sectional view of the lens is a triangle, and two included angles of each triangle close to the bottom surface are respectively smaller than 45 degrees and greater than 0 degree.

In one embodiment of the invention, each of the optical microstructures is a ball protrusion protruding outward relative to the bottom surface, a profile of each of the ball protrusions in a cross-sectional view of the lens is an inferior arc.

In one embodiment of the invention, the bottom surface is a rough surface.

In one embodiment of the invention, the first optical surface and the second optical surface of the central portion are aspheric surfaces.

In one embodiment of the invention, the central portion and the surrounding portion are rotationally symmetric relative to the symmetry axis.

In one embodiment of the invention, the outer refraction wall further comprises at least one third outer surface, the third outer surface is respectively connected to the first outer surface and the second outer surface, and an included angle between the third outer surface and the normal vector of the bottom surface is θ5, wherein the included angle θ5 is smaller than or equal to 45 degrees and is greater than or equal to 0 degree.

In one embodiment of the invention, the optical distance is greater than 0 mm and is smaller than or equal to 10 mm.

In one embodiment of the invention, the optical distance is equal to 10 mm, and the pitch is equal to 80 mm.

According to the above descriptions, in the aforementioned embodiments of the invention, the backlight module includes the lens with the aforementioned structure design, and the ratio between the optical distance and the pitch of the light emitting diodes is small, so as to provide uniform light brightness distribution.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2A:
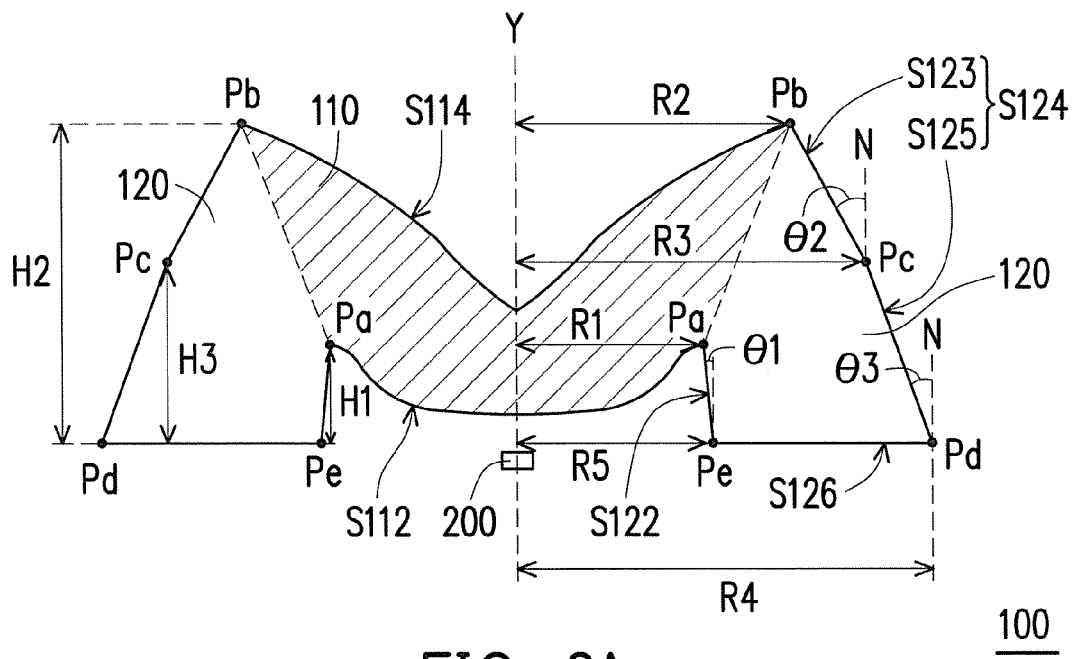
FIG. 2A is a cross-sectional view of a lens according to an embodiment of the invention.
Figure 2B:
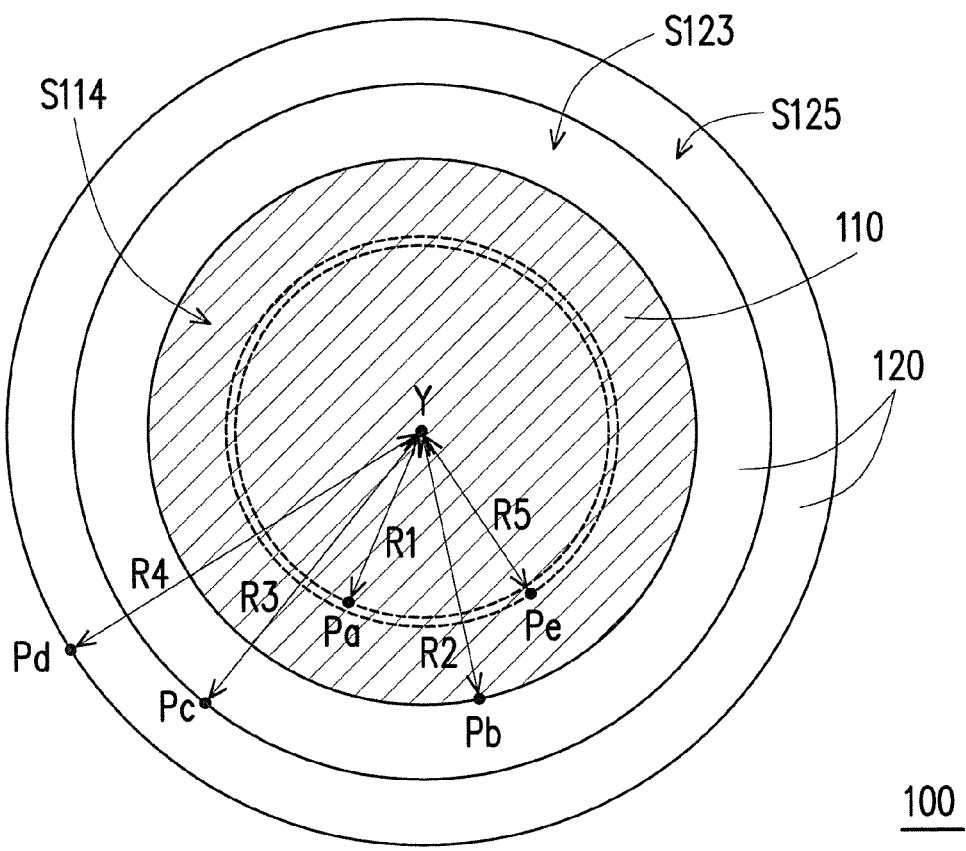
FIG. 2B is a top view of the lens of FIG. 2A.

FIG. 2A is a cross-sectional view of a lens according to an embodiment of the invention. FIG. 2B is a top view of the lens of FIG. 2A. Referring to FIG. 2A and FIG. 2B, the lens 100 of the embodiment includes a central portion 110 and a surrounding portion 120. The central portion 110 has a first optical surface S112 and a second optical surface S114 opposite to the first optical surface S112. In the embodiment, the first optical surface S112 and the second optical surface S114 are aspheric surfaces. A material of the lens 100 is, for example, glass, polymethylmethacrylate (PMMA), polycarbonate (PC), etc. having a transparent property. The first optical surface S112 and the second optical surface S114 are, for example, polished transparent surfaces.

In the embodiment, the surrounding portion 120 has an inner refraction wall S122 and an outer refraction wall S124 opposite to the inner refraction wall S122 and a bottom surface S126. The inner refraction wall S122 is connected to the first optical surface S112 of the central portion 110 to form a recess. The recess is used for accommodating a light emitting diode (LED) 200. The outer refraction wall S124 includes a first outer surface S123 and a second outer surface S125. The first outer surface S123 is connected to the second optical surface S114 of the central portion 110, and the second outer surface S125 is connected to the first outer surface S123. According to the cross-sectional view of the lens 100 of FIG. 2A, in the embodiment, the first outer surface S123 is a straight line, and the second outer surface S125 is a straight line, though the invention is not limited thereto. In other embodiments, the first outer surface S123 may be a curve, and the second outer surface S125 may also be a curve, or the first outer surface S123 is a curve, and the second outer surface S125 is a straight line, or the first outer surface S123 is a straight line, and the second outer surface S125 is a curve, which is determined according to an actual design requirement. The bottom surface S126 is connected to the second outer surface S125 and the inner refraction wall S122. In the embodiment, scales of the LED 200 and the lens 100 are only an example, and are not used for limiting the invention.

According to the top view of the lens 100 of FIG. 2B, in the embodiment, the surrounding portion 120 surrounds the central portion 110 while taking a symmetry axis Y of the central portion 110 as a center. The central portion 110 is, for example, a main body of the lens 100, and the surrounding portion 120 is, for example, a ring-shape supporting foot. The central portion 110 and the surrounding portion 120 are rotationally symmetric relative to the symmetry axis Y. In the embodiment, taking the symmetry axis Y as a center, a distance between the symmetry axis Y and a junction Pa of the inner refraction wall S122 and the first optical surface S112 is a first radius R1. A distance between the symmetry axis Y and a junction Pb of the first outer surface S123 and the second optical surface S114 is a second radius R2. A distance between the symmetry axis Y and a junction Pc of the second outer surface S125 and the first outer surface S123 is a third radius R3. A distance between the symmetry axis Y and a junction Pd of the bottom surface S126 and the second outer surface S125 is a fourth radius R4. A distance between the symmetry axis Y and a junction Pe of the bottom surface S126 and the inner refraction wall S122 is a fifth radius R5.

In the embodiment, the third radius R3 is greater than the second radius R2, and the second radius R2 is greater than or equal to the first radius R1. The fourth radius R4 is greater than the third radius R3. The fifth radius R5 is greater than or equal to the first radius R1, and the second radius R2 is greater than or equal to the fifth radius R5. The first radius R1, the second radius R2, the third radius R3 and the fourth radius R4 are complied with following conditions: $0.75<R3/R4<0.9$, $0.6<R2/R4<0.75$, $0.4<R1/R4<0.6$. In an embodiment, the first radius R1 is, for example, greater than 3.8 mm and smaller than 5.7 mm, the second radius R2 is, for example, greater than 5.7 mm and smaller than 7.2 mm, the third radius R3 is, for example, greater than 7.2 mm and smaller than 8.6 mm, and the fourth radius R4 is, for example, 9.5 mm, though the invention is not limited thereto.

Referring to FIG. 2A, in the embodiment, the bottom surface S126 is, for example, disposed on a surface of a substrate of a backlight module (not shown). In the embodiment, a distance between the bottom surface S126 and the junction Pa of the inner refraction wall S122 and the first optical surface S112 is a first vertical height H1. A distance between the bottom surface S126 and the junction Pb of the first outer surface S123 and the second optical surface S114 is a second vertical height H2. A distance between the bottom surface S126 and the junction Pc of the second outer surface S125 and the first outer surface S123 is a third vertical height H3. In other embodiments, the bottom surface S126 may include a plurality of optical microstructures or may be a rough surface, though the optical microstructures and the rough surface do not influence a definition of the first vertical height H1, the second vertical height H2 and the third vertical height H3.

In the embodiment, the second vertical height H2 is greater than the third vertical height H3, and the third vertical height H3 is greater than or equal to the first vertical height H1. The first vertical height H1, the second vertical height H2 and the third vertical height H3 are complied with following conditions: $0.4<H3/H2<0.7$, $0.2<H1/H2<0.4$. In an embodiment, the first vertical height H1 is, for example, greater than 1.5 mm and smaller than 3 mm, the second vertical height H2 is, for example, 7.5 mm, and the third vertical height H3 is, for example, greater than 3 mm and smaller than 5.3 mm, though the invention is not limited thereto.

Referring to FIG. 2A, in the embodiment, an included angle between the inner refraction wall S122 and a normal vector N of the bottom surface S126 is $\theta 1$. An included angle between the first outer surface S123 and the normal vector N of the bottom surface S126 is $\theta 2$. An included angle between the second outer surface S125 and the normal vector N of the bottom surface S126 is $\theta 3$.

In the embodiment, the included angle $\theta 1$ is smaller than or equal to 10 degrees and is greater than or equal to 0 degree. The included angle $\theta 2$ is smaller than or equal to 45 degrees and is greater than 0 degree. The included angle $\theta 3$ is smaller than or equal to 45 degrees and is greater than 0 degree. The included angle $\theta 2$ is not equal to the included angle $\theta 3$, and the included angle $\theta 2$ and the included angle $\theta 3$ are all greater than the included angle $\theta 1$. By adjusting the included angle $\theta 1$, the included angle $\theta 2$ and the included angle $\theta 3$, light brightness uniformity of the backlight module may be effectively ameliorated.

In the embodiment of the invention, the lens structure is not limited to the embodiment shown in FIG. 2A and FIG. 2B. Outlines of various optical surfaces, various inner refraction walls, various outer surfaces and the bottom surface of the lens 100 may be designed and adjusted according to actual structure parameters, so as to produce the lens structure coping with the spirit of the invention. The structure parameters include but are not limited to radius, vertical heights and included angles.

Figure 3:
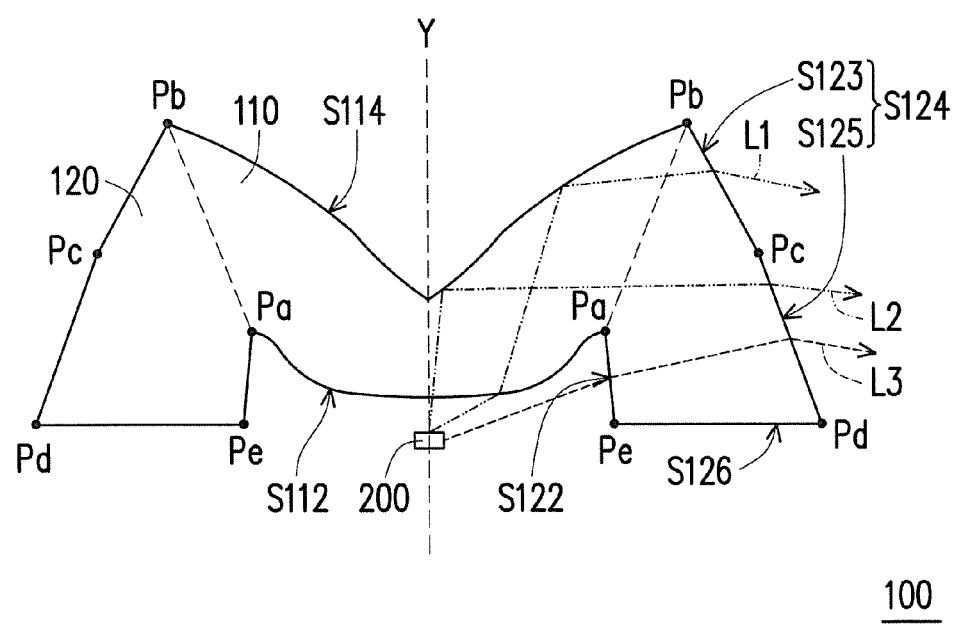
FIG. 3 is a cross-sectional view of a transmission path of light beam in the lens of FIG. 2A.

FIG. 3 is a cross-sectional view of a transmission path of light beam in the lens of FIG. 2A. Referring to FIG. 3, in the embodiment, the lens 100 processes light beams L1, L2 and L3 of different angles that are emitted by the LED 200 through different optical surfaces, inner refraction walls, outer surfaces and the bottom surface. For example, the first optical surface S112 of the central portion 110 is an aspheric surface protruding towards the LED 200, and the second optical surface S114 of the central portion 110 is an aspheric surface recessed towards the LED 200. A part of the light beams L1 and L2 emitted by the LED 200 are incident to the first optical surface S112. The other light beam L3 emitted by the LED 200 is refracted out through the surrounding portion 120.

In the embodiment, the first optical surface S112 is an aspheric surface protruding towards the LED 200, such that the light beams L1 and L2 with small angles (for example, light beams having an included angle with the symmetry axis Y within 60 degrees) that are emitted by the LED 200 may be refracted into the central portion 110, so as to control the angles of the light beams entering the central portion 110. However, according to the current technique, the first optical surface S112 is generally a recessed surface or a plane, by which the light beams with large angles (for example, light beams having the included angle with the symmetry axis Y beyond 60 degrees) that are emitted by the LED 200 enter the central portion 110 of the lens 100 through the first optical surface S112, such that the fourth radius R4 of the lens 100 has to be increased in order to control the light beams entered the central portion 110 in large angles, and a size of the lens is increased, and the cost thereof is accordingly increased. Therefore, in the embodiment, the light beams with large angles do not enter the central portion 110 of the lens 100, and the surrounding portion 120 is used to control (refract) the light beams with large angles, so as to reduce the fourth radius R4 of the lens 100 and accordingly reduce the size of the lens 100. Then, after the light beams L1 and L2 with small angles enter the first optical surface S112, the light beams L1 and L2 are totally reflected by the second optical surface S114. Thereafter, the light beams L1 and L2 are respectively refracted out of the lens 100 by the first outer surface S123 and the second outer surface S125 of the surrounding portion 120. The first outer surface S123 includes but is not limited to control the light beams irradiating an area away from the lens 100. The second outer surface S125 includes but is not limited to control the lights irradiating an area close to the lens 100.

Figure 1:
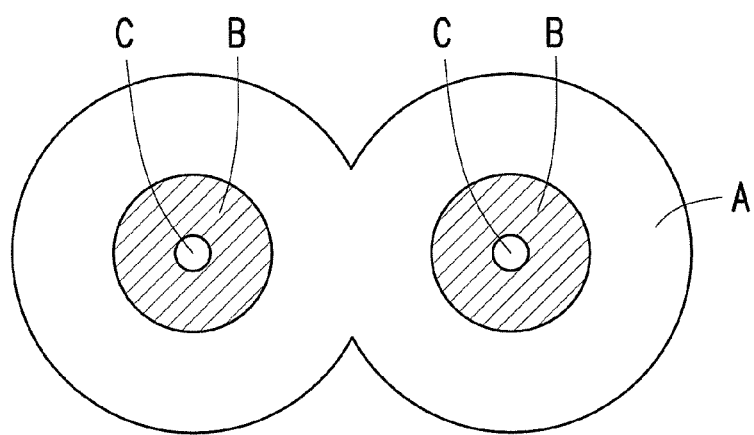
FIG. 1 is a schematic diagram of brightness distribution of a backlight module according to the existing technique.

Further, referring to FIG. 1, FIG. 2A and FIG. 3, since the first outer surface S123 and the normal vector N of the bottom surface S126 include the included angle $\theta 2$ there between, and the first outer surface S123 inclines towards the symmetry axis Y, the light beam L1 may be refracted downwards by the first outer surface S123 to emit out, and in case of the application of the backlight module, the light beam L1 may be further reflected by a reflector (not shown in FIG. 1 to FIG. 3, referring to FIG. 9, the reflector is, for example, disposed on a surface S932), so that the first outer surface S123 makes the light beam L1 to irradiate the area A away from the lens 100, and after being reflected by the reflector, a light uniform effect of the light beam L1 is further improved. Moreover, since the second outer surface S125 and the normal vector N of the bottom surface S126 include the included angle $\theta 3$ there between, and the second outer surface S125 inclines towards the symmetry axis Y, the light beam L2 may be refracted downwards by the second outer surface S125 to emit out, and in case of the application of the backlight module, the light beam L2 may be further reflected by the reflector, so that the second outer surface S125 makes the light beam L2 to irradiate the area B close to the lens 100, and after being reflected by the reflector, the light uniform effect of the light beam L2 is further improved. Therefore, the first outer surface S123 and the second outer surface S125 of the lens 100 make the light beams L1 and L2 to simultaneously irradiate the area A away from the lens 100 and the area B close to the lens 100. In this way, the problem of dark ring formed at the area B close to the lens 100 due to inadequate light beam of the existing technique is resolved, and a uniform light brightness distribution is achieved. In overall, the outer refraction wall S124 (from the top of the lens to the bottom of the lens) of the lens 100 is composed of a plurality of inclined surfaces inclined towards the symmetry axis Y or a plurality of vertical surfaces, which is not saw-toothed (composed of inclined surfaces with positive and negative slopes) viewing from the cross-sectional view, since the saw-toothed design is liable to directly guide the light beam upward to a diffusion plate (referring to FIG. 9), and especially in case of a demand of thin optical distance, it is easy to produce a bright ring. Theretofore, the lens 100 of the embodiment may adjust a light distribution, by which light brightness uniformity of the backlight module is improved under the demand of thin optical distance.

Moreover, the lens 100 of the embodiment may be applied to a package free LED. The light beam with a large angle that is emitted by the package free LED, or the light beam emitted from a side edge of the LED, for example, the light beam L3, is refracted by the inner refraction wall S122 of the surrounding portion 120, and is refracted downwards by the first outer surface S123 or the second outer surface S125 to emit out of the lens 100. As described above, the first outer surface S123 and the second outer surface S125 of the lens 100 make the light beam L3 to irradiate the area A away from the lens 100 or the area B close to the lens 100. Therefore, such structure design of the lens may effectively improve the light brightness uniformity of the backlight module.

In the embodiment of the invention, the bottom surface S126 of the surrounding portion 120 of the lens 100 may includes a plurality of optical microstructures or may be a rough surface. The rough surface is, for example, a non-smooth surface or a surface with micro protrusions.

Figure 4:
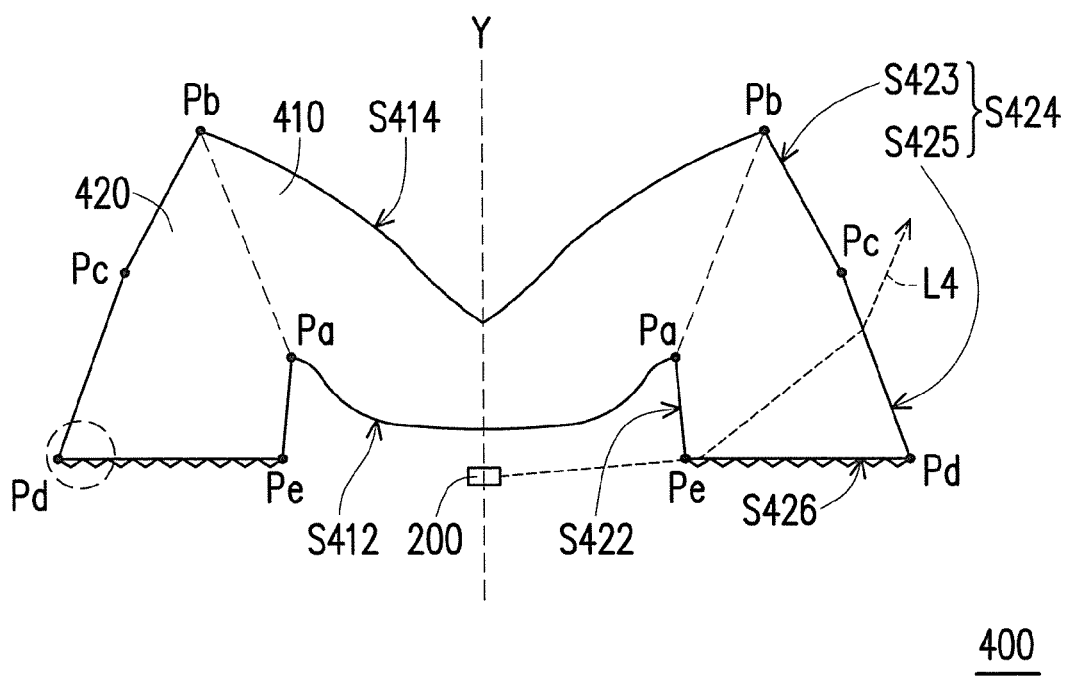
FIG. 4 is a cross-sectional view of a lens according to another embodiment of the invention.
Figure 5:
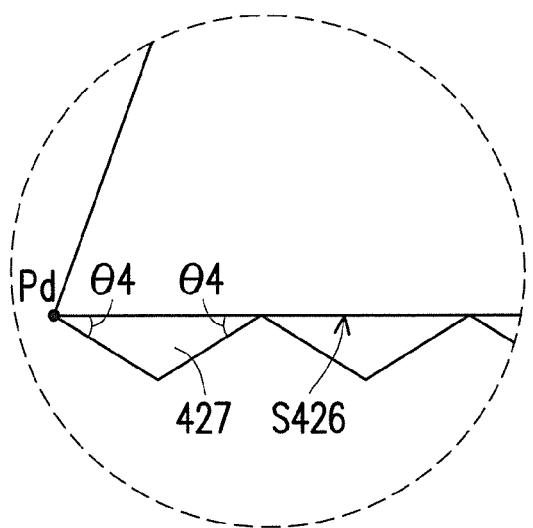
FIG. 5 is a partial enlarged view of optical microstructures of FIG. 4.

FIG. 4 is a cross-sectional view of a lens according to another embodiment of the invention. FIG. 5 is a partial enlarged view of optical microstructures of FIG. 4. Referring to FIG. 2A, FIG. 4 and FIG. 5, the lens 400 of the embodiment is similar to the lens 100 of FIG. 2A, and a main difference there between is that a bottom surface S426 of a surrounding portion 420 of the lens 400 further includes a plurality of optical microstructures 427. In the embodiment, each of the optical microstructures 427 is, for example, a cone protruding outward relative to the bottom surface S426. According to the cross-sectional views of FIG. 4 and FIG. 5, each of the cones is a triangle. However, it should be noted that the invention is not limited thereto, in other embodiment, each of the optical microstructures 427 is, for example, a pyramid protruding outward relative to the bottom surface S426. A profile of each of the pyramids in a cross-sectional view of the lens is also a triangle. Two included angles θ4 of each triangle close to the bottom surface S426 are respectively smaller than 45 degrees and greater than 0 degree, and the two included angles θ4 may be the same or different. In the embodiment, the optical microstructures 427 may scatter the light beam L4 refracted or reflected by the bottom surface S426, so as to effectively improve the light brightness uniformity of the backlight module.

Figure 6:
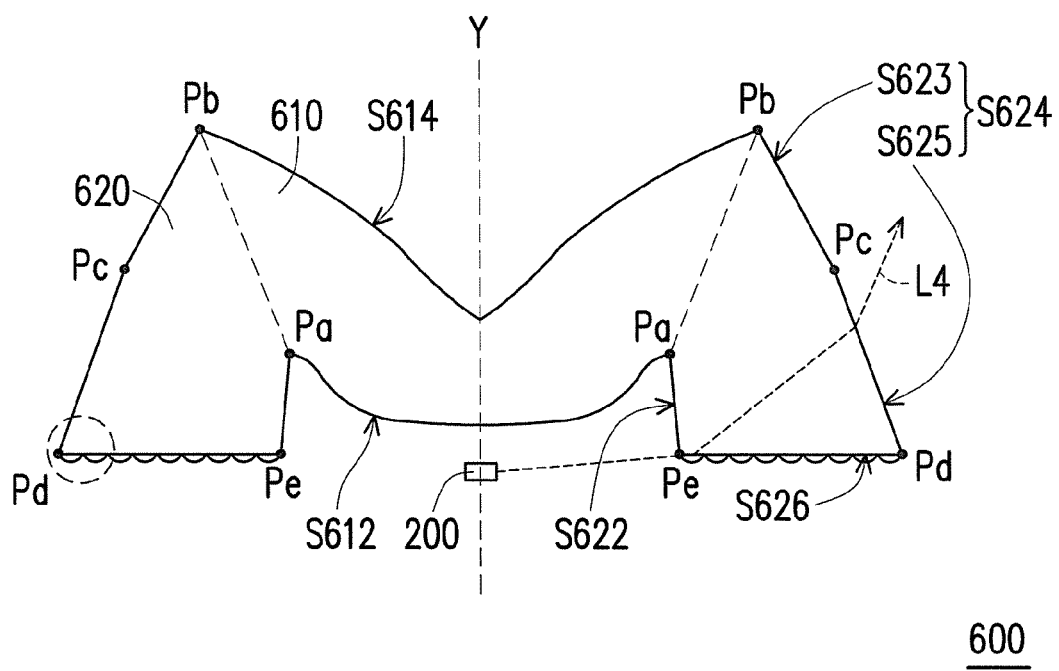
FIG. 6 is a cross-sectional view of a lens according to another embodiment of the invention.
Figure 7:
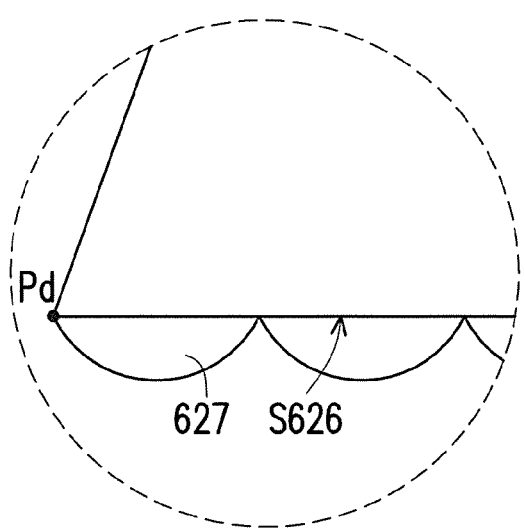
FIG. 7 is a partial enlarged view of optical microstructures of FIG. 6.

FIG. 6 is a cross-sectional view of a lens according to another embodiment of the invention. FIG. 7 is a partial enlarged view of optical microstructures of FIG. 6. Referring to FIG. 4 to FIG. 7, the lens 600 of the embodiment is similar to the lens 400 of FIG. 4, and a main difference there between is that each of optical microstructures 627 on a bottom surface S626 is, for example, a ball protrusion protruding outward relative to the bottom surface S626. According to the cross-sectional views of FIG. 6 and FIG. 7, a profile of each of the ball protrusion s is an inferior arc.

Figure 8A:
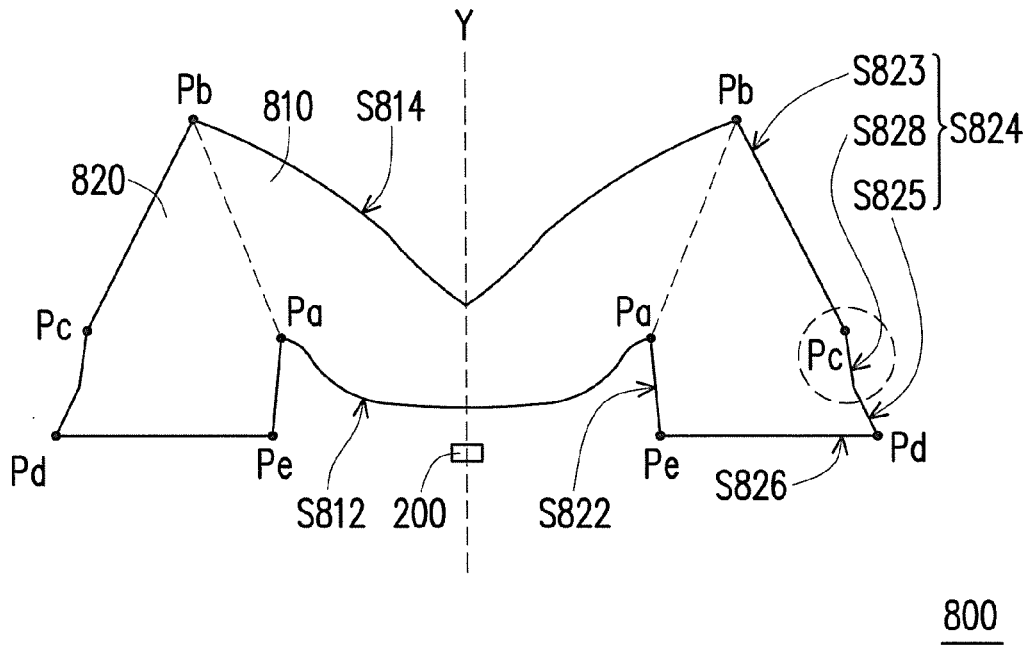
FIG. 8A is a cross-sectional view of a lens according to another embodiment of the invention.
Figure 8B:
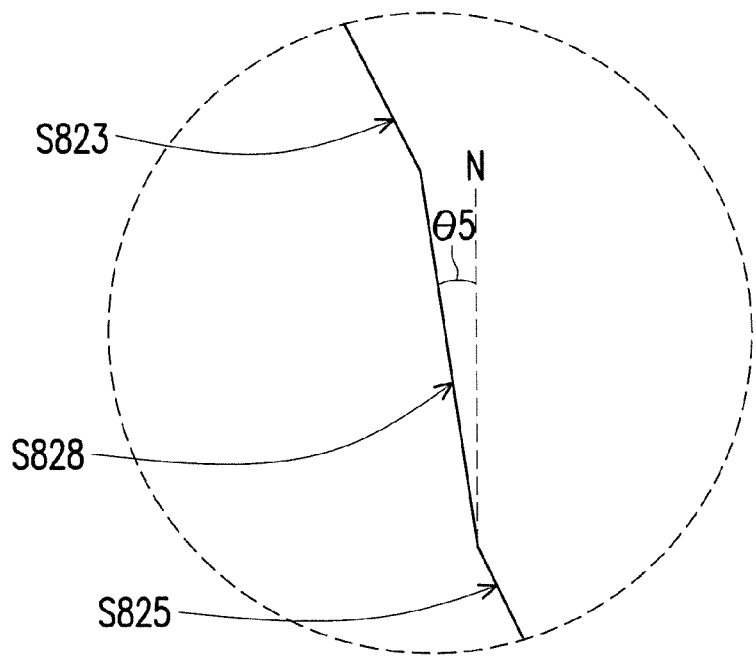
FIG. 8B is a partial enlarged view of an outer refraction wall of FIG. 8A.

FIG. 8A is a cross-sectional view of a lens according to another embodiment of the invention. FIG. 8B is a partial enlarged view of an outer refraction wall of FIG. 8A. Referring to FIG. 2A, FIG. 8A and FIG. 8B, the lens 800 of the embodiment is similar to the lens 100 of FIG. 2A, and a main difference there between is that the outer refraction wall S824 further includes at least one third outer surface S828, and the third outer surface S828 is respectively connected to a first outer surface S823 and a second outer surface S825. The third outer surface S828 may further adjust the light distribution, and may provide a buffer between the first outer surface S823 and the second outer surface S825, so as to avoid a sharp turn between the first outer surface S823 and the second outer surface S825 to cause fabrication difficulty. Further, the third outer surface S828 is, for example, substantially parallel to the symmetry axis Y, or include an included angle θ5 with the normal vector N of the bottom surface S826, and is inclined towards the symmetry axis Y as shown in FIG. 8B. Therefore, as described in the embodiments of FIG. 1, FIG. 2A and FIG. 3, the light beam may be refracted downwards by the third outer surface S828 to emit out, and is further reflected by the reflector (not shown), so as to implement a uniform light brightness distribution effect. The included angle θ5 is smaller than or equal to 45 degrees, and is greater than or equal to 0 degree.

Figure 9:
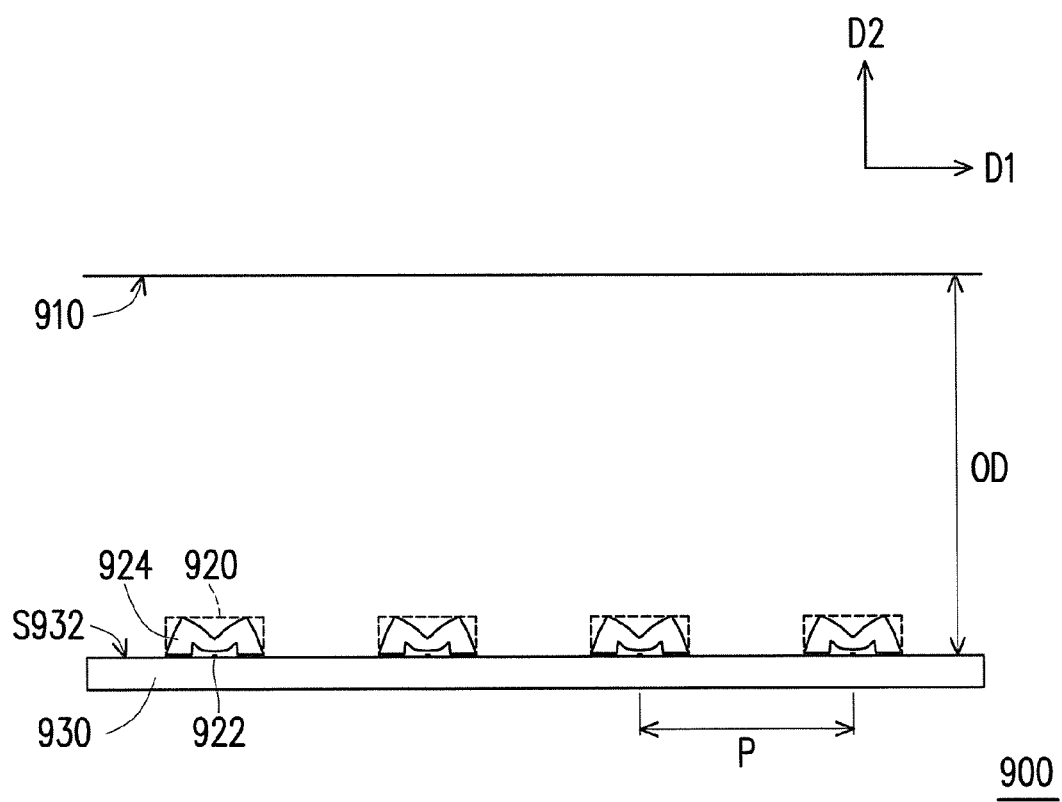
FIG. 9 is a partial cross-sectional view of a backlight module according to an embodiment of the invention.

FIG. 9 is a partial cross-sectional view of a backlight module according to an embodiment of the invention. Referring to FIG. 9, the backlight module 900 of the embodiment is, for example, a direct-under type backlight module, and is adapted to provide a backlight source for a display module (not shown). The backlight module 900 includes a diffusion plate 910 and a plurality of light emitting units 920. The light emitting units 920 are arranged in an array, and are disposed on a surface S932 of a substrate 930. The light emitting units 920 are arranged in a pitch P along a direction D1. The substrate 930 and the diffusion plate 910 are spaced by an optical distance OD along a direction D2, where the direction D2 is perpendicular to the direction D1. In the embodiment, each of the light emitting units 920 includes an LED 922 and a lens 924. The combination of the LED 922 and the lens 924 of each of the light emitting unit 920 includes but is not limited to any combination of the LED and the lens of the embodiment of FIG. 2A, FIG. 4, FIG. 6 or FIG. 8A. In the embodiment, scales of the light emitting units 920 and the backlight module 900 are only an example, and are not used for limiting the invention.

Based on an optical simulation test, in the embodiment, by using the structure design of any lens in FIG. 2A, FIG. 4, FIG. 6 and FIG. 8A, the brightness uniformity of the backlight module 900 may still be maintained in case that a ratio between the optical distance OD and the pitch P is smaller than or equal to 0.13. In the embodiment, the optical distance OD is greater than 0 mm and is smaller than or equal to 10 mm. For example, in the embodiment, the optical distance OD is equal to 10 mm, and the pitch is equal to 80 mm, though the invention is not limited thereto. Further, the smaller the ratio between the optical distance OD and the pitch P is, the longer the pitch P of the lens is under the same optical distance OD, by which the numbers of the LEDs and the lenses may be decreased to reduce a production cost, or under the same pitch P, the optical distance OD may be decreased to implement thinness of the product. Compared to the existing technique, it is assumed that the pitches P are all 80 mm, since the existing secondary optical lens may be only used in the optical distance OD of 25 mm, and the ratio between the optical distance OD and the pitch P is 0.31, while any lens in the embodiment of FIG. 2A, FIG. 4, FIG. 6 or FIG. 8A may be used in the optical distance OD of 10 mm, and the ratio between the optical distance OD and the pitch P is 0.13, which is obvious smaller than the ratio of 0.31 corresponding to the secondary optical lens. Therefore, in collaboration with the structure design of any lens in FIG. 2A, FIG. 4, FIG. 6 or FIG. 8A, the backlight module 900 of the embodiment may have a low ratio between the optical distance OD and the pitch P, and may provide good light brightness uniformity under a thin thickness of the backlight module 900.

In summary, the embodiments of the invention may have at least one of the following advantages and effects. In the embodiments of the invention, the backlight module includes the lens with the aforementioned structure design, and the ratio between the optical distance and the pitch of the LEDs is small, so as to provide uniform light brightness distribution. In an embodiment of the invention, the surface of the lens contacting the substrate of the backlight module may include optical microstructures, so as to further improve the light brightness uniformity.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A lens, comprising:
a central portion, having a first optical surface and a second optical surface opposite to the first optical surface; and
a surrounding portion, surrounding the central portion while taking a symmetry axis of the central portion as a center, and having a bottom surface, an inner refraction wall and an outer refraction wall opposite to the inner refraction wall, wherein the inner refraction wall is connected to the first optical surface to form a recess, and the recess is used for accommodating a light emitting diode, the outer refraction wall comprises a first outer surface and a second outer surface, the first outer surface is connected to the second optical surface, and the second outer surface is connected to the first outer surface,
wherein taking the symmetry axis as a center, a distance between the symmetry axis and a junction of the inner refraction wall and the first optical surface is a first radius R1, a distance between the symmetry axis and a junction of the first outer surface and the second optical surface is a second radius R2, and a distance between the symmetry axis and a junction of the second outer surface and the first outer surface is a third radius R3, wherein the third radius R3 is greater than the second radius R2, and the second radius R2 is greater than or equal to the first radius R1,
wherein the first optical surface is protruding towards the light emitting diode, the second optical surface is recessed towards the light emitting diode,
wherein an included angle between the first outer surface and a normal vector of the bottom surface is $\theta 2$, and an included angle between the second outer surface and the normal vector of the bottom surface is $\theta 3$,
wherein the included angle $\theta 2$ is smaller than or equal to 45 degrees and is greater than 0 degree, and
wherein the included angle $\theta 3$ is smaller than or equal to 45 degrees and is greater than 0 degree.

2. The lens as claimed in claim 1, wherein the bottom surface connects the second outer surface and the inner refraction wall.

3. The lens as claimed in claim 2, wherein a distance between the symmetry axis and a junction of the bottom surface and the second outer surface is a fourth radius R4, wherein the fourth radius R4 is greater than the third radius R3.

4. The lens as claimed in claim 3, wherein the first radius R1, the second radius R2, the third radius R3 and the fourth radius R4 are complied with following conditions: 0.75<R3/R4<0.9, 0.6<R2/R4<0.75, 0.4<R1/R4<0.6.

5. The lens as claimed in claim 2, wherein a distance between the symmetry axis and a junction of the bottom surface and the inner refraction wall is a fifth radius R5, wherein the fifth radius R5 is greater than or equal to the first radius R1, and the second radius R2 is greater than or equal to the fifth radius R5.

6. The lens as claimed in claim 2, wherein a distance between the bottom surface and the junction of the inner refraction wall and the first optical surface is a first vertical height H1, a distance between the bottom surface and the junction of the first outer surface and the second optical surface is a second vertical height H2, and a distance between the bottom surface and the junction of the second outer surface and the first outer surface is a third vertical height H3, wherein the second vertical height H2 is greater than the third vertical height H3, and the third vertical height H3 is greater than or equal to the first vertical height H1.

7. The lens as claimed in claim 6, wherein the first vertical height H1, the second vertical height H2 and the third vertical height H3 are complied with following conditions: 0.4<H3/H2<0.7, 0.2<H1/H2<0.4.

8. The lens as claimed in claim 2, wherein an included angle between the inner refraction wall and the normal vector of the bottom surface is $\theta 1$, wherein the included angle $\theta 1$ is smaller than or equal to 10 degrees and is greater than or equal to 0 degree.

9. The lens as claimed in claim 2, wherein the included angle θ2 is not equal to the included angle θ3.

10. The lens as claimed in claim 9, wherein an included angle between the inner refraction wall and the normal vector of the bottom surface is θ1, wherein the included angle θ2 and the included angle θ3 are greater than the included angle θ1.

11. The lens as claimed in claim 2, wherein in a cross-sectional view of the lens, the first outer surface is a straight line or a curve, and the second outer surface is a straight line or a curve.

12. The lens as claimed in claim 2, wherein the bottom surface comprises a plurality of optical microstructures.

13. The lens as claimed in claim 12, wherein each of the optical microstructures is a cone protruding outward relative to the bottom surface, a profile of each of the cones in a cross-sectional view of the lens is a triangle, and two included angles of each triangle close to the bottom surface are respectively smaller than 45 degrees and greater than 0 degree.

14. The lens as claimed in claim 12, wherein each of the optical microstructures is a ball protrusion protruding outward relative to the bottom surface, a profile of each of the ball protrusions in a cross-sectional view of the lens is an inferior arc.

15. The lens as claimed in claim 2, wherein the bottom surface is a rough surface.

16. The lens as claimed in claim 1, wherein the first optical surface and the second optical surface of the central portion are aspheric surfaces.

17. The lens as claimed in claim 1, wherein the central portion and the surrounding portion are rotationally symmetric relative to the symmetry axis.

18. The lens as claimed in claim 2, wherein the outer refraction wall further comprises at least one third outer surface, the first outer surface is connected to the second outer surface by the at least one third outer surface, and an included angle between the at least one third outer surface and the normal vector of the bottom surface is θ5, wherein the included angle θ5 is smaller than or equal to 45 degrees and is greater than or equal to 0 degree.

19. A backlight module, adapted to provide a backlight source to a display module, comprising:
   a diffusion plate; and
   a plurality of light emitting units, arranged in an array on a substrate, wherein the light emitting units are arranged in a pitch along a direction, and the substrate and the diffusion plate are spaced by an optical distance, wherein each of the light emitting units comprises a light emitting diode and a lens, and the lens comprises:
      a central portion, having a first optical surface and a second optical surface opposite to the first optical surface; and
      a surrounding portion, surrounding the central portion while taking a symmetry axis of the central portion as a center, and having a bottom surface, an inner refraction wall and an outer refraction wall opposite to the inner refraction wall, wherein the inner refraction wall is connected to the first optical surface to form a recess, the recess is used for accommodating the light emitting diode, the outer refraction wall comprises a first outer surface and a second outer surface, the first outer surface is connected to the second optical surface, and the second outer surface is connected to the first outer surface, taking the symmetry axis as a center, a distance between the symmetry axis and a junction of the inner refraction wall and the first optical surface is a first radius R1, a distance between the symmetry axis and a junction of the first outer surface and the second optical surface is a second radius R2, and a distance between the symmetry axis and a junction of the second outer surface and the first outer surface is a third radius R3, wherein the third radius R3 is greater than the second radius R2, and the second radius R2 is greater than or equal to the first radius R1,
   wherein a ratio between the optical distance and the pitch is smaller than or equal to 0.13,
   wherein the first optical surface is protruding towards the light emitting diode, the second optical surface is recessed towards the light emitting diode,
   wherein an included angle between the first outer surface and a normal vector of the bottom surface is θ2, and an included angle between the second outer surface and the normal vector of the bottom surface is θ3,
   wherein the included angle θ2 is smaller than or equal to 45 degrees and is greater than 0 degree, and
   wherein the included angle θ3 is smaller than or equal to 45 degrees and is greater than 0 degree.

20. The backlight module as claimed in claim 19, wherein the optical distance is greater than 0 mm and is smaller than or equal to 10 mm.

21. The backlight module as claimed in claim 20, wherein the optical distance is equal to 10 mm, and the pitch is equal to 80 mm.

22. The backlight module as claimed in claim 19, wherein the surrounding portion has a bottom surface, and the bottom surface connects the second outer surface and the inner refraction wall.

23. The backlight module as claimed in claim 22, wherein a distance between the symmetry axis and a junction of the bottom surface and the second outer surface is a fourth radius R4, wherein the fourth radius R4 is greater than the third radius R3.

24. The backlight module as claimed in claim 23, wherein the first radius R1, the second radius R2, the third radius R3 and the fourth radius R4 are complied with following conditions: $0.75 < R3/R4 < 0.9$, $0.6 < R2/R4 < 0.75$, $0.4 < R1/R4 < 0.6$.

25. The backlight module as claimed in claim 22, wherein a distance between the symmetry axis and a junction of the bottom surface and the inner refraction wall is a fifth radius R5, wherein the fifth radius R5 is greater than or equal to the first radius R1, and the second radius R2 is greater than or equal to the fifth radius R5.

26. The backlight module as claimed in claim 22, wherein a distance between the bottom surface and the junction of the inner refraction wall and the first optical surface is a first vertical height H1, a distance between the bottom surface and the junction of the first outer surface and the second optical surface is a second vertical height H2, and a distance between the bottom surface and the junction of the second outer surface and the first outer surface is a third vertical height H3, wherein the second vertical height H2 is greater than the third vertical height H3, and the third vertical height H3 is greater than or equal to the first vertical height H1.

27. The backlight module as claimed in claim 26, wherein the first vertical height H1, the second vertical height H2 and the third vertical height H3 are complied with following conditions: $0.4 < H3/H2 < 0.7$, $0.2 < H1/H2 < 0.4$.

28. The backlight module as claimed in claim 22, wherein an included angle between the inner refraction wall and the normal vector of the bottom surface is θ1, wherein the included angle θ1 is smaller than or equal to 10 degrees and is greater than or equal to 0 degree.

29. The backlight module as claimed in claim 22, wherein the included angle θ2 is not equal to the included angle θ3.

30. The backlight module as claimed in claim 29, wherein an included angle between the inner refraction wall and the normal vector of the bottom surface is θ1, wherein the included angle θ2 and the included angle θ3 are greater than the included angle θ1.

31. The backlight module as claimed in claim 19, wherein in a cross-sectional view of the lens, the first outer surface is a straight line or a curve, and the second outer surface is a straight line or a curve.

32. The backlight module as claimed in claim 22, wherein the bottom surface comprises a plurality of optical microstructures.

33. The backlight module as claimed in claim 32, wherein each of the optical microstructures is a cone protruding outward relative to the bottom surface, a profile of each of the cones in a cross-sectional view of the lens is a triangle, and two included angles of each triangle close to the bottom surface are respectively smaller than 45 degrees and greater than 0 degree.

34. The backlight module as claimed in claim 32, wherein each of the optical microstructures is a ball protrusion protruding outward relative to the bottom surface, a profile of each of the ball protrusion s in a cross-sectional view of the lens is an inferior arc.

35. The backlight module as claimed in claim 22, wherein the bottom surface is a rough surface.

36. The backlight module as claimed in claim 19, wherein the first optical surface and the second optical surface of the central portion are aspheric surfaces.

37. The backlight module as claimed in claim 19, wherein the central portion and the surrounding portion are rotationally symmetric relative to the symmetry axis.

38. The backlight module as claimed in claim 22, wherein the outer refraction wall further comprises at least one third outer surface, the first outer surface is connected to the second outer surface by the at least one third outer surface, and an included angle between the at least one third outer surface and the normal vector of the bottom surface is θ5, wherein the included angle θ5 is smaller than or equal to 45 degrees and is greater than or equal to 0 degree.

* * * * *